United States Patent Office 3,022,353
Patented Feb. 20, 1962

3,022,353
PREPARATION OF 4-CHLORODIPHENYL OXIDE
Howard J. Sloane, Fullerton, Calif., and Kenneth B. Bradley, Midland, Mich., assignors to The Dow Chemical Company, Midland, Mich., a corporation of Delaware
No Drawing. Filed Apr. 25, 1960, Ser. No. 24,219
1 Claim. (Cl. 260—612)

The present invention relates to chlorination of aromatic compounds and is more particularly concerned with a new and useful process for preparing monochlorodiphenyl oxides wherein the ratio of para-chloro substitution to ortho-chloro substitution is greater than 9:1.

Heretofore the nuclear chlorination of aromatic compounds has resulted in a ratio of para substitution to ortho substitution of 4:1 or less. In most instances this has not been detrimental to the utilization of the chlorodiphenyl oxide as an intermediate chemical. However, it has on occasion presented some concern that the desirable para-chloro compound could not be obtained in higher yields. This has been particularly true in agricultural and topical medicinal applications wherein the chlorodiphenyl oxide is an intermediate in the synthesis.

It has now been unexpectedly found that the ratio of para substitution to ortho substitution can be increased to 9:1 or more by chlorinating the diphenyl oxide in the liquid state in the absence of a catalyst. Good results are obtained when the reaction is carried out at from above 10° to about 50° C. and at atmospheric pressure, subatmospheric or superatmospheric pressure. The reaction is carried out in the absence of a reaction solvent. In carrying out the process diphenyl oxide is charged to a reaction vessel and chlorine gas bubbled or sparged through the diphenyl oxide. The initial temperature is preferably above the melting point of the diphenyl oxide but as the reaction proceeds the temperature can be reduced to about 10° C. by external cooling and/or the rate of chlorine fed. The amount of chlorine fed is dependent upon two factors: firstly, how high a ratio of para to ortho is desired; and, secondly, the amount of dichlorination which can be tolerated. It has been observed that when the degree of chlorination is somewhat less than 50 percent for monochlorination the highest para to ortho ratio is obtained. However, economics dictate that the chlorination be carried in most instances to above 50 or more percent for monochlorination. It has usually been found that from about 0.5 to 1.2 moles of chlorine per mole of diphenyl oxide is preferable for economic operation of the process.

The following examples illustrate the present invention but are not to be construed as limiting:

Example 1

One mole (170 grams) of diphenyl oxide was heated to 30° C. in a glass reactor and chlorine gas sparged at about 3 p.s.i.g. through the reaction mixture. Samples were withdrawn periodically from the reaction vessel and when monochlorination was about 50 percent complete the chlorination was stopped and the reaction mixture analyzed by infrared spectroscopy and found to have the following composition:

| | Percent |
|---|---|
| 2-chlorodiphenyl oxide | 3.3 |
| 4-chlorodiphenyl oxide | 37.0 |
| Dichlorodiphenyl oxide | 7.4 |
| Trichlorodiphenyl oxide | 1.0 |
| Unidentifiable material | 1.3 |
| Diphenyl oxide | 50.0 |

The para to ortho ratio was $$\frac{37}{3.3} = 11 \text{ to } 1$$

Examples 2 through 4

In the manner of Example 1 a comparison is made employing the process of the present invention and various solvents and catalysts.

| Example No. | Solvent | Catalyst | Composition, percent | | Ratio, 4-chloro to 2-chloro |
|---|---|---|---|---|---|
| | | | 2-Chloro | 4-Chloro | |
| 2 | None | None | 4 | 44 | 11:1 |
| 3 | Methanol | do | 8.5 | 53 | 6.2:1 |
| 4 | None | 1% FeCl₃ | 8 | 44 | 5.5:1 |

Examples 5–10

Since ferric chloride was found to be detrimental to obtaining the desired results the reaction was run in the presence of various other metals as catalysts to determine the effect of the presence of the metal on the reaction. In the manner of Example 1 employing various metallic catalysts in glass equipment the following results were obtained.

| Example No. | Metal | Composition, percent | | Ratio, 4-Chloro to 2-Chloro |
|---|---|---|---|---|
| | | 2-Chloro | 4-Chloro | |
| 5 | Nickel | 2.8 | 30.8 | 11:1 |
| 6 | None | 2.7 | 30.4 | 11:1 |
| 7 | 307 Stainless Steel H 558 | 3.2 | 33.4 | 10.5:1 |
| 8 | Monel #238 | 2.6 | 32.2 | 12:1 |
| 9 | Copper (Deox) #58 | 3.6 | 34.0 | 9.4:1 |
| 10 | Iron | 6.2 | 31.2 | 5:1 |

It is thus obvious that the various metals, except iron, can be employed as reaction vessel material of construction.

We claim:

A process for producing a mixture of mono chlorodiphenyl oxides wherein at least 90 percent by weight of said mixture is 4-chlorodiphenyl oxide which consists of reacting by contacting liquid diphenyl oxide and chlorine gas at a temperature of from about 10° to about 50° C., said chlorine being employed in an amount from about 0.5 to 1.2 moles of chlorine per mole of diphenyl oxide, said reaction being conducted in an environment free of solvent and iron catalyst.

References Cited in the file of this patent

UNITED STATES PATENTS 2,022,634    Britton et al. _____ Nov. 26, 1935

OTHER REFERENCES

Mailhe et al.: Bulletin de la Societe Chemique de France, 4th series, Vol. 11 (1912), pages 328–332.